Nov. 7, 1939.  T. V. COX ET AL  2,178,562
SPRING DEVICE FOR VEHICLES
Filed March 3, 1938  2 Sheets-Sheet 1
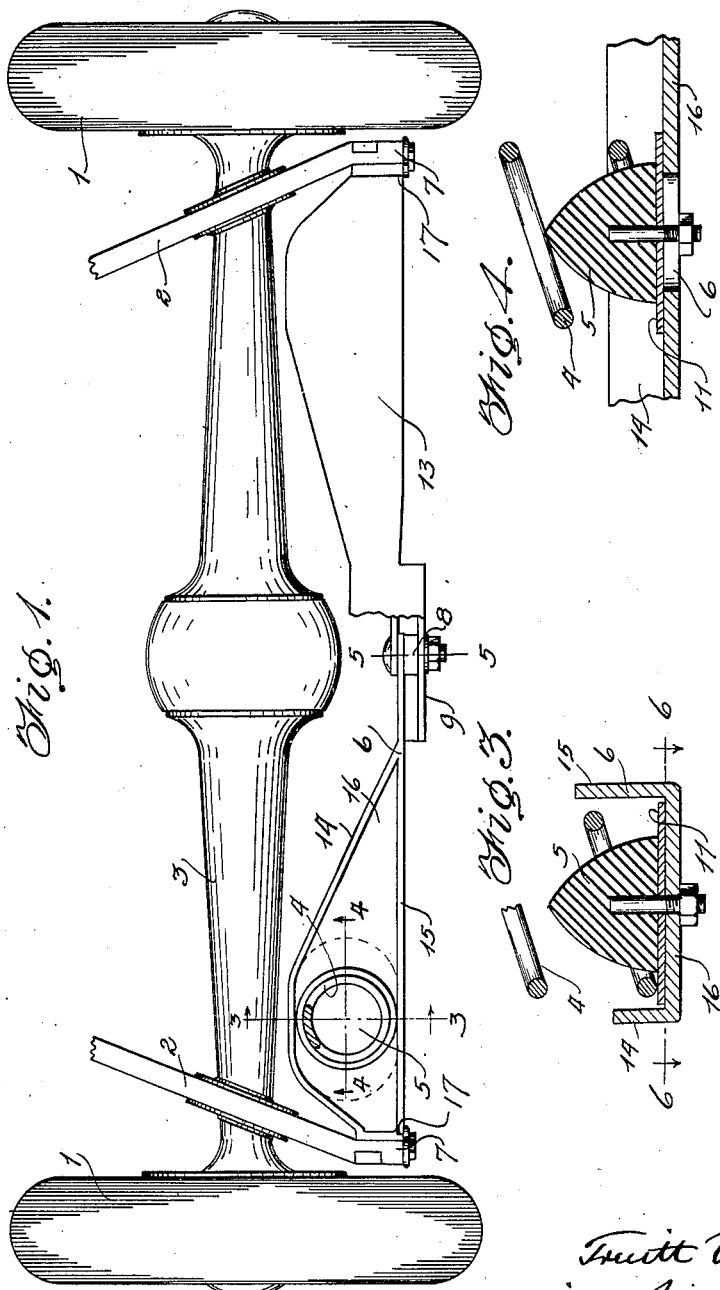

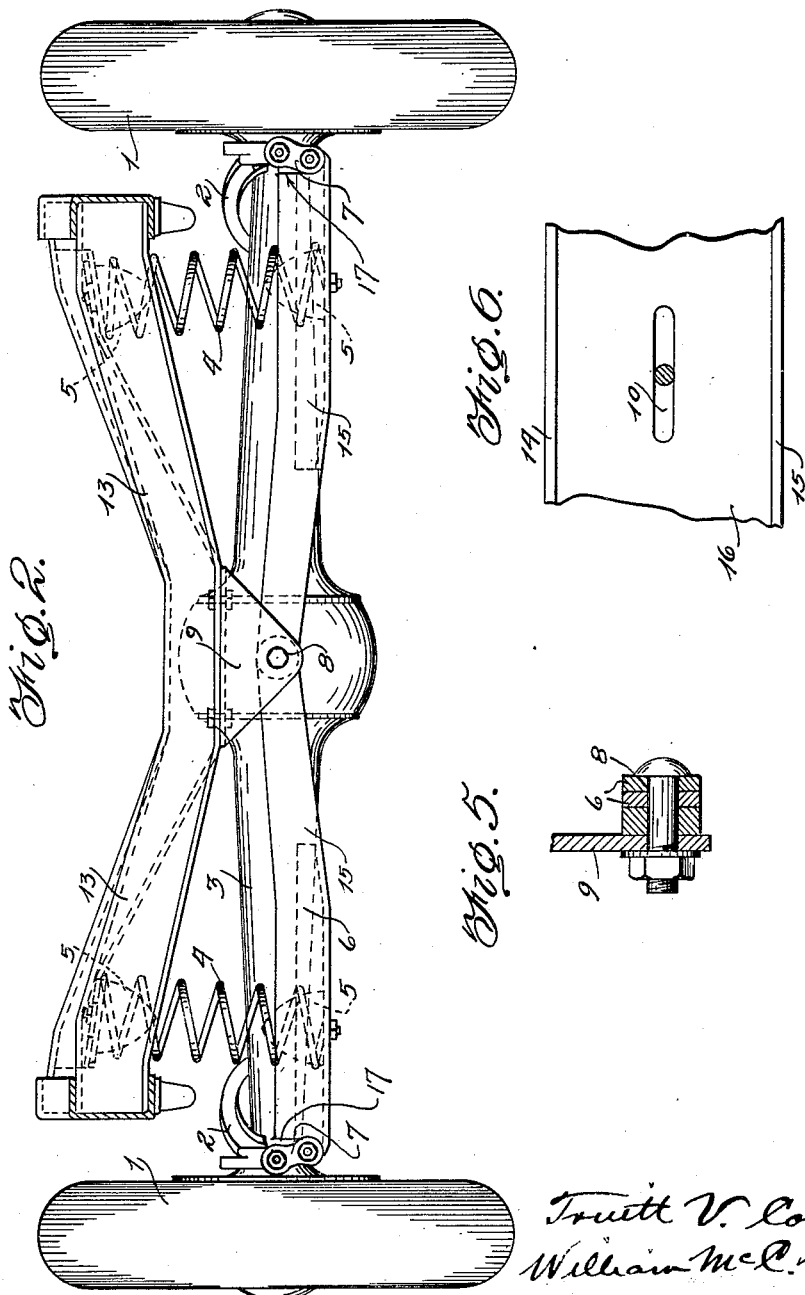

Patented Nov. 7, 1939

2,178,562

UNITED STATES PATENT OFFICE 2,178,562

SPRING DEVICE FOR VEHICLES

Truitt Vesta Cox and William McCormick Neale, Greensboro, N. C., assignors of one-third to Albert H. Thaeler, Greensboro, N. C.

Application March 3, 1938, Serial No. 193,768

2 Claims. (Cl. 267—20)

Our invention relates to spring devices for vehicles, and more particularly to an automobile spring rigging for the rear axle, whereby an inexpensive spring device is furnished and made effective in operation. One of the main objects of the invention is to cause the vehicle to hold to the road at high speed on a curve, and to counteract side sway effectively by means of the two springs and bars controlling the same.

A further object of the device is to provide a convenient means for changing the effective strength of the springs with little effort. The invention is not only practical, but durable and cheaply manufactured.

In the drawings forming a part of this specification, and in which like symbols of reference represent corresponding parts in the several views:

Figure 1 is a plan view of the device, partly in section;

Figure 2 is a rear elevation of the device, partly in section;

Figure 3 is a section on line 3—3, Figure 1;

Figure 4 is a section on line 4—4, Figure 1;

Figure 5 is a section on line 5—5, Figure 1; and,

Figure 6 is a section on line 6—6, of Figure 3.

In the drawings, the numeral 1 represents the wheels of the machine; 2 the radius rods of the rear axle; and 3 the rear axle housing. 4 is one of the two helical springs which replace the usual leaf springs; and 5 is a centering pad over and under the springs, two of which are wedged into the cross member of the frame. The material of the pads is preferably rubber covered metal.

6 is one of the two spring-supporting arms pivoted into link 7, thence by means of said link to the ends of radius rods 2. The other ends of said supporting arms 6 are pivoted at 8 on plate 9, which plate 9 is bolted to cross member of frame. 10 is a slot in supporting arms 6 by means of which spring pad 11 is moved horizontally to increase or decrease the effect or power of springs 4.

The supporting arms 6 comprise flanges 14 and 15, and a web 16. 13 are radial arms receiving upper ends of springs, said arms may be dispensed with where a suitable frame member is available to receive spring pads 5.

The operation and advantages of our invention will be apparent from the foregoing description. It will be clear that as spring pads 11, together with the lower ends of springs 4, are moved toward or away from pivot 8, that the leverage of arms 6 will be changed in such a manner as to effectively change the strength of springs 4 in their support of the body load on the vehicle. We take advantage of the above fact in providing only one set of springs for use on vehicles with widely varying loads, also where loads are not, or cannot be placed central, we may compensate for this by means of our adjustment.

By means of the leverage of arms 6, when the body load tends to sway to one side, as in rounding curves, a certain proportion of the excess compressive force of spring 4 on the outside of the curve is transmitted through arm 6 to pivot 8, which counteracts to a great extent the tendency of the body to tip over. Pivot 8 being rigidly attached to the vehicle body and arms 6 being attached to the running gear of the vehicle by means of links 7 the side movement of the body with respect to the running gear is limited by means of upstanding stops at 17 on arm 6, which engage the ends of radius rods 2, when their movement is great enough.

Having now fully described our invention, what we claim as new, and desire to secure by Letters Patent, is:

1. A spring for vehicles, comprising a frame, a plurality of arms, said arms being channel-shaped with upwardly directed flanges, radial arms, elastic means between the same, radius rods, and connections between the flanged arms and radius rods.

2. A spring device for vehicles, comprising a frame, arms pivotally connected to the same at the center thereof, springs interposed between the arms and said frame, said springs being laterally adjustable by slots in the web of the arms, centering pads for the springs, radius rods, and connections between the radius rods and arms.

TRUITT VESTA COX.
WILLIAM McCORMICK NEALE.